(12) United States Patent
Berger et al.

(10) Patent No.: US 7,367,924 B2
(45) Date of Patent: May 6, 2008

(54) METHOD FOR CONTROLLING GEAR-SHIFTING PROCESSES OF A POWERSHIFT GEARBOX AND CORRESPONDING POWERSHIFT GEARBOX

(75) Inventors: Reinhard Berger, Bühl (DE); Gunter Hirt, Puschendorf (DE); Alexander Schweizer, Walzbachtal-Jöhlingen (DE); Boris Serebrennikov, Bühl-Kappelwindeck (DE); Lidvar Budal, Kongsberg (NO); Brad Shellhammer, Bühl (DE); Jeremy Whitmer, Bühl (DE); Dietmar Lang, Höheischweiler (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 276 days.

(21) Appl. No.: 10/907,409

(22) Filed: Mar. 31, 2005

(65) Prior Publication Data

US 2006/0016282 A1 Jan. 26, 2006

Related U.S. Application Data

(63) Continuation of application No. PCT/DE03/003173, filed on Sep. 24, 2003.

(30) Foreign Application Priority Data

Oct. 4, 2002 (DE) ................. 102 46 330

(51) Int. Cl.
*B60W 10/02* (2006.01)
*B60W 10/04* (2006.01)
(52) U.S. Cl. ..................... 477/181; 477/174
(58) Field of Classification Search ............... 477/174, 477/181; 74/335
See application file for complete search history.

(56) References Cited

U.S. PATENT DOCUMENTS

2003/0054920 A1* 3/2003 Berger et al. ............. 477/70

FOREIGN PATENT DOCUMENTS

| DE | 4204401 A1 | 8/1993 |
| EP | 1122116 A | 8/2001 |
| EP | 1072820 A3 | 12/2004 |
| WO | WO 2004/033246 A3 | 4/2004 |

* cited by examiner

*Primary Examiner*—Tisha Lewis
(74) *Attorney, Agent, or Firm*—Simpson & Simpson, PLLC

(57) ABSTRACT

A method for controlling gear-shifting processes of a powershift gearbox which can be coupled to a drive motor and has gear steps including two friction clutches and a plurality of clutches, and at least one gearbox actuator for actuating the gear steps. The method includes the following steps: the torque of the drive motor is received by the new friction clutch associated with the new gear step to be engaged; before the disengagement of the old gear step and before or during the torque reception, a pre-determined pre-tensioning force is applied to the clutch of the old gear step by the gearbox actuator; and the old gear step is disengaged when the motor torque and the clutch torque are balanced.

8 Claims, 4 Drawing Sheets

METHOD FOR CONTROLLING GEAR-SHIFTING PROCESSES OF A POWERSHIFT GEARBOX AND CORRESPONDING POWERSHIFT GEARBOX

CROSS REFERENCE TO RELATED APPLICATIONS

This application is filed under 35 U.S.C. §120 and §365(c) as a continuation of International Patent Application PCT/DE2003/003173, filed Sep. 24, 2003, which application is incorporated herein by reference. This application also claims priority of German Patent Application 102 46 330.1, filed Oct. 4, 2002, which application is incorporated herein by reference.

FIELD OF THE INVENTION

This invention relates to a method for controlling gear-shifting processes of a powershift gearbox that can be coupled to a drive motor, which has two friction clutches as well as several gear steps displaying several clutches and at least one gearbox actuator to actuate the gear steps. The invention furthermore relates to a powershift gearbox that operates according to this method.

BACKGROUND OF THE INVENTION

Powershift gears, in the form of, for example, an uninterruptible gearbox, have already become known along with the previously known manual gearboxes, for instance, for passenger cars, where the speed is changed or where the gearshift process is performed by the vehicle's driver by actuating a gearshift lever as well as automatic gearshifts in the form of planetary gears. Such a powershift gearbox displays a start element in the form of a friction clutch and has a second friction clutch by means of which it is possible, when the starting clutch is depressed and when a torque acts upon the primary gear shaft, to transmit the torque between the primary shaft and the output shaft of the gear so that a switching process can be brought about without any interruption in the traction force.

Gears by means of which one can perform power shifts have already also become known under the term of the "double-clutch gear." Such a double-clutch gear can be construed as two series-nested automated gears, where gear pairs as well as a friction clutch are associated with each gear input shaft by means of synchronized claw clutches or clutches.

The gears or gear steps of such a double-clutch gear can be connected by at least one gear actuator and the clutches can be connected by, for example, one clutch actuator each.

In a routine driving mode, the drive moment of the combustion engine is transmitted via one of the two clutches, the pertinent primary gear shaft as well as a gear step that is associated with the particular primary gear shaft to the differential, and from the latter, it is further passed on to the wheels.

When a gear-shifting process is to take place and when the vehicle is in the normal driving mode, then the friction clutch, associated with the engaged gear step, is closed and the other friction clutch is opened and the pertinent target gear step can be engaged. By depressing the new friction clutch associated with the target gear step, said new friction clutch determines the flow of moments via the new target gear step and thus also the flow of moments via the old gear step that is still engaged. The new friction clutch here is first of all in a state of slippage that later on changes into stiction, or static friction, state. After the new target gear step or the new friction clutch has completely taken over the moment, the friction clutch, associated with the old gear step, is released and, as a result, the corresponding gear part is uncoupled from the moment transmission. After a synchronization process between the engine revolution number and the gear revolution number, the vehicle then runs in the new target gear step and the friction clutch, associated with the latter, will no longer slip.

A so-called overlap gearshift was described above, where, however, as a result of inexact overlaps, there can be moment jolts, something that in the final analysis can be illustrated as an acceleration change when the gear is shifted.

SUMMARY OF THE INVENTION

On this basis, the object of this invention is to provide a method for controlling switching processes, which will prevent moment jolts. A power-shiftable gear, operating according to this method, is also to be created.

The invention, devised to solve this problem in terms of the procedure involved, now provides the following: a method for controlling gear-shifting processes of a powershift gearbox that can be coupled with a drive motor or engine, which powershift gearbox has two friction clutches as well as gear steps displaying several clutches and at least one gear actuator to actuate the gear steps and where the moment of the drive motor or engine is taken over in the form of a traction moment or a thrust moment by means of the new friction clutch that is associated with the new gear step that is to be engaged, and where, prior to the disengagement of the old gear step that is to be disengaged and before or during the moment takeover by the new friction clutch by means of the gear actuator, a predetermined pre-stress force is applied to the clutch of the old gear step and where, when the engine moment and the clutch moment are in balance, the old gear step is automatically disengaged by the predetermined tension force, or pre-stress force.

The following can be achieved as a result in an advantageous manner: due to the predetermined pre-stress force applied by the gear actuator on the gearing of the old gear step as the moment runs through the zero (moment balance on the clutch of the new gear step), the gear actuator easily can pull out the gear and thus there will take place an overlap gearshift between the friction clutch and the clutch of the new gear step and there will no longer be an overlap gearshift between two friction clutches.

According to a development of the invention, it is provided that the slippage in the new friction clutch be reduced after the disengagement of the old gear step. It proved advantageous here when the slippage in the new friction clutch is reduced by means of a combined engagement upon the engine moment and the clutch moment.

Compared to the modulation of the clutch moment with the drive motor moment unchanged, this procedure offers the advantage that the noticeable vehicle acceleration does not change. Also, an alternative procedure, that is to say, to perform an engine engagement while the clutch moment remains constant, would be disadvantageous because, due to its inertia, the combustion engine would be relatively difficult to adjust.

The following can be achieved by the abovementioned combined action upon the engine moment and the clutch moment: the engine moment needs to be controlled only in the form of a required setting, which, according to an advantageous embodiment, takes place in such a fashion that the integral of the differential moment in case of an unchanged clutch moment brings about the adaptation of the number of revolutions. By the differential moment, we here mean the difference between the engine moment and the clutch moment according to the following relationship:

$$\frac{1}{J_{Motor}} \int_{T_{Start}}^{T_{End}} (M_{Motor} - M_{Clutch}) \cdot dt = \Delta\omega$$

The following is provided here according to an advantageous development of the invention: at the start of the slippage reduction, the required engine moment is changed according to a jump function and then is extensively adapted in a linear fashion, depending on the driver's desired moment after the switching process.

Continuing the invention after an extensive approach of the engine moment to the clutch moment, the new friction clutch is so triggered that a gentle transition will take place from the slippage state into the stiction state of the new friction clutch. The better the engine engagement is implemented in the process, the less the clutch moment need be modulated and, by the same token, the moment acting upon the power takeoff will be all the smoother.

Because of the electronic foot pedals (E-gas) that are often encountered in vehicles, it is now possible to cancel the direct connection between the foot pedal and the throttle valve angle and thus to adjust different engine moments. In that way, one can make sure that the drive moment, acting upon the wheel before and after a switching process, can be kept extensively constant. It turned out rather advantageously here that the engine moment is changed already during the moment takeover by the new friction clutch. In that way, one can make sure that the acceleration reduction that acts upon the power takeoff can be compensated for due to the powershift branching in the gear as the second friction clutch is applied by means of a coordinated engine moment increase.

The invention also provides a method for the implementation of a starting process of a vehicle with a drive motor or engine and with a powershift gearbox that can be coupled therewith, according to which the starting process is performed by a highly transmitted first gear step and the engine moment is taken over by the new friction clutch before the slippage state of the old friction clutch associated with the first gear step terminates or before the number of revolutions of the primary gear shaft with the first gear step attains the engine revolution number.

Here is what that means, in other words: a start procedure is performed with a short-transmission first gear, something that results in a high acceleration during starting, and the engine moment is taken over already by the new friction clutch associated with the second gear step before the slippage state (the old friction clutch, associated with the first gear step, is in the slippage state during startup) of the old friction clutch, associated with the first gear step, will terminate or before the number of revolutions of the primary gear shaft of the first gear step has attained the engine revolution number. On the one hand, this leads to a high start-up acceleration and does not result in a loss of comfort during the subsequent switching process from the first to the second gear step because the new friction clutch, associated with the second gear step, already takes over the engine moment, while the old friction clutch, associated with the first gear step, is still in the slippage state and before the primary gear shaft with the first gear step arranged thereupon has attained the engine revolution number.

The invention provides a powershift gearbox with two friction couplings as well as gear steps displaying several clutches and at least one gear actuator to actuate the gear steps, where the gear actuator, before or during the moment takeover by means of a new friction clutch associated with the gear step that is to be engaged, applies a predetermined pre-stress force upon the clutch of the old gear step that is to be disengaged and where, when the engine moment and the clutch moment are in balance, the old gear step is automatically disengaged by the pre-stress force.

The powershift gearbox, thus designed, facilitates the swift disengagement of the old gear step at the instant of moment balance on the clutch of the new gear step so that there will be an overlap clutch between the friction clutch and the clutch of the new gear step and there will no longer be an overlap clutch between two friction clutches, which means that modulations of the clutch moment of the old friction clutch can no longer be expressed through acceleration changes of the vehicle.

According to a development of the invention, the powershift gearbox has a high-transmission first gear step and a friction clutch that takes over the engine moment from the friction clutch associated with the first gear step before the slippage state of the friction clutch associated with the first gear step terminates or before the number of revolutions of the primary gear shaft with the first gear step has attained the engine revolution number.

Here, the gear facilitates a start-up process with high vehicle acceleration and a high gearshift comfort because one avoids a pronounced acceleration change at the end of accelerated speed in the first gear where a moment takeover by the clutch, associated with the second gear step, takes place already before the slippage state of the friction clutch, associated with the first gear, terminates or before the number of revolutions of the primary gear shaft with the first gear step has reached the engine revolution number.

BRIEF DESCRIPTION OF THE DRAWINGS

The invention will be explained in greater detail below with reference to the drawings.

FIG. 1 is a diagram presenting a schematic illustration of the engine moment as well as the clutch moments during the switching process, plotted against the time. In this schematic illustration, the engine moment 1 remains constant during the switching process. Clutch moment 2 of the friction clutch, associated with the old gear step that is to be disconnected, remains constant in this schematic illustration and, compared to the engine moment, displays a moment excess. Clutch moment 3 of the new friction clutch 3, associated with the new gear step in this schematic illustration during moment takeover, rises extensively in a linear fashion and then approaches the engine moment 1.

In phase $t_1$, a predetermined pre-stress force is applied via the gear actuator to the clutch of the old gear step that is to be disengaged so that at the instant of moment balance on the new friction clutch, the gear actuator can easily and quickly release the already pre-stressed clutch gearing. This procedure makes it possible to achieve an approach to the ideal state that would be reached if, at the moment of balance between engine moment and friction moment in the clutch of the new gear, the old gear could be uncoupled with infinitely fast speed. Due to the predetermined pre-stress force on the clutch gearing of the old gear step, one can quickly disengage the old gear step and one can prevent the possible occurrence of moment jolts as might happen in an overlapped gearshift between two friction clutches.

Figure 1:
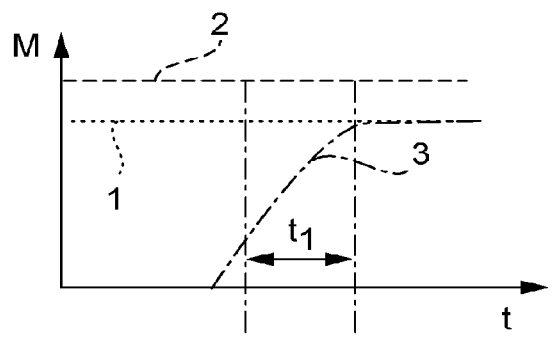
FIG. 1 is a diagram illustrating the engine and clutch moment during the switching procedure over time.
Figure 2:
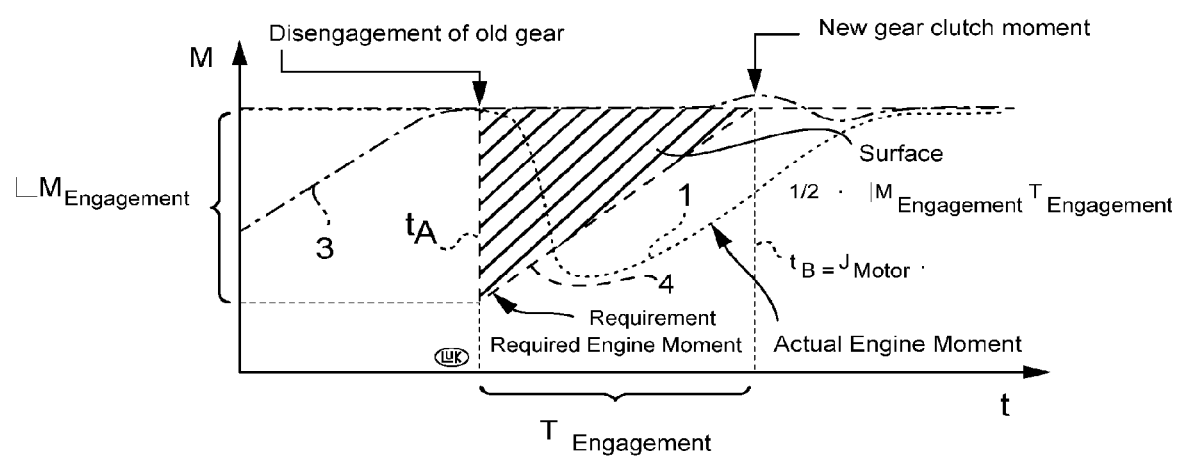
FIG. 2 is a diagram showing engine engagement.

FIG. 2 of the drawing now shows a diagram illustrating a controlled engine engagement during engine synchronization.

The required engine moment here is to be precisely selected in such a way that the integral of the differential moment from the engine moment takes place in a manner reduced by the clutch moment during the time within which engine engagement takes place and brings about the adjustment of the number of revolutions during engine synchronization while the clutch moment is unchanged.

Clutch moment 3 of the clutch associated with the new gear step rises already prior to the instant $t_A$ until the actual engine moment 1 has been attained. At instant $t_A$, the old gear step is disengaged and engine synchronization commences, that is to say, the slippage in the clutch, associated with the new gear, must be reduced. For this purpose, the required engine moment must at instant $t_A$ be altered in a stepped fashion and must then be adapted in ramp fashion to the engine moment desired by the driver, something that, for example, can correspond to the engine moment prior to engagement. The hachured area in FIG. 2 here corresponds to the abovementioned integral plotted against the differential moment from engine moment and clutch moment and thus to the inertial moment of the engine multiplied by the change in the number of revolutions during engine synchronization.

As one can see in FIG. 2, clutch moment 3 of the new friction clutch, associated with the new target gear step, is increased slightly prior to the instant $t_B$ at which engine engagement is terminated so that there is a gentle transition from the slippage state into the stiction state of the clutch.

Figure 3A:
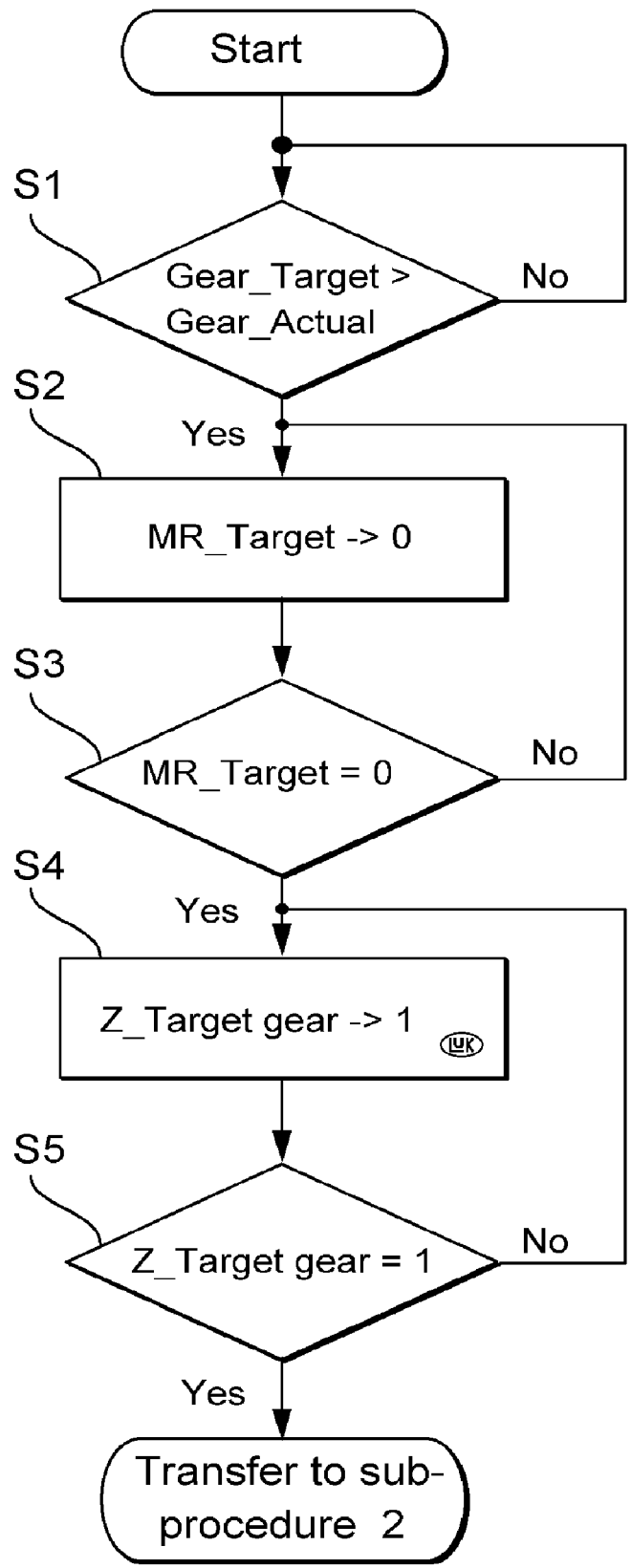
FIG. 3A-C are flow charts to explain a switching process.
Figure 3B:
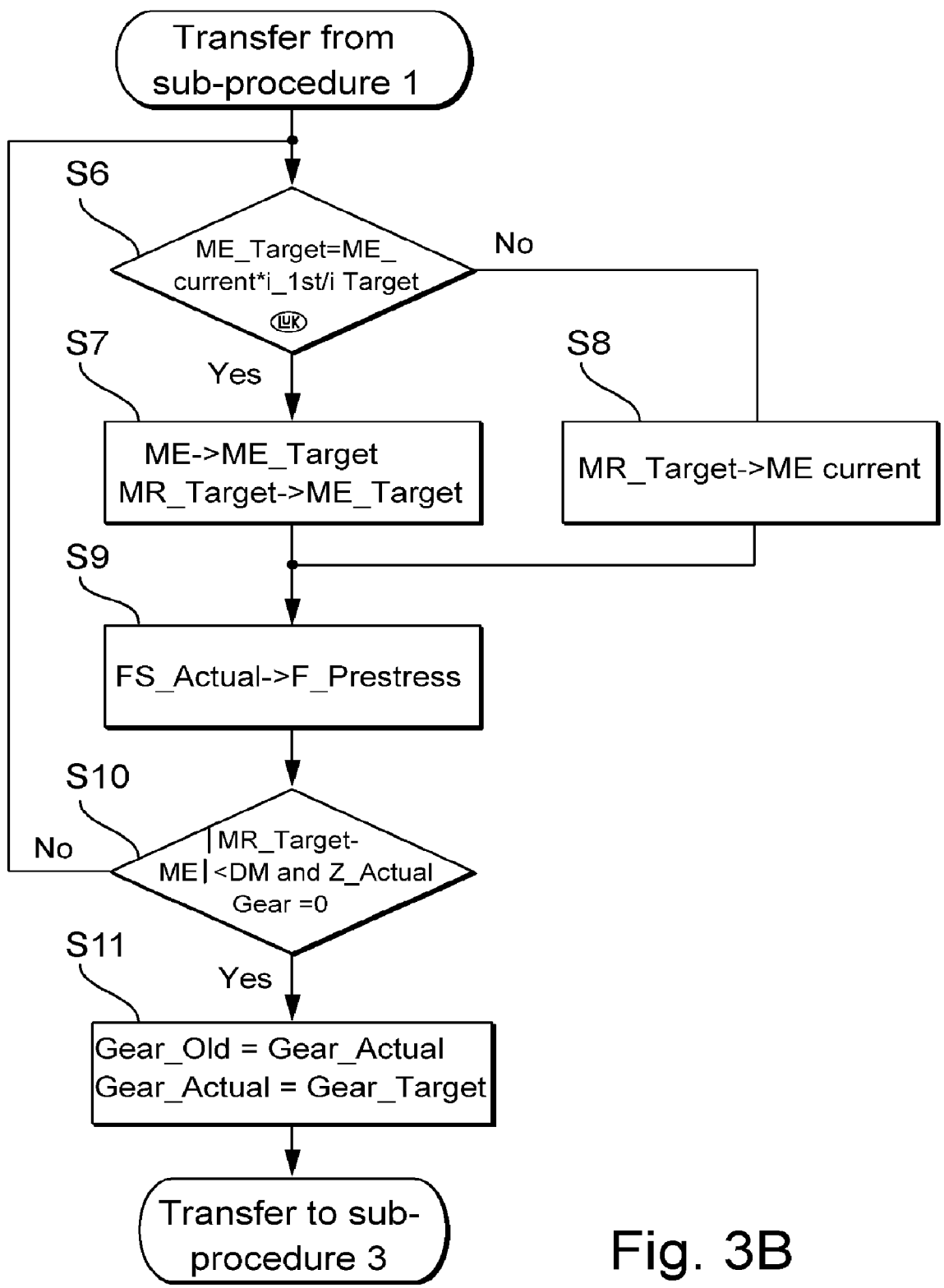
Figure 3C:
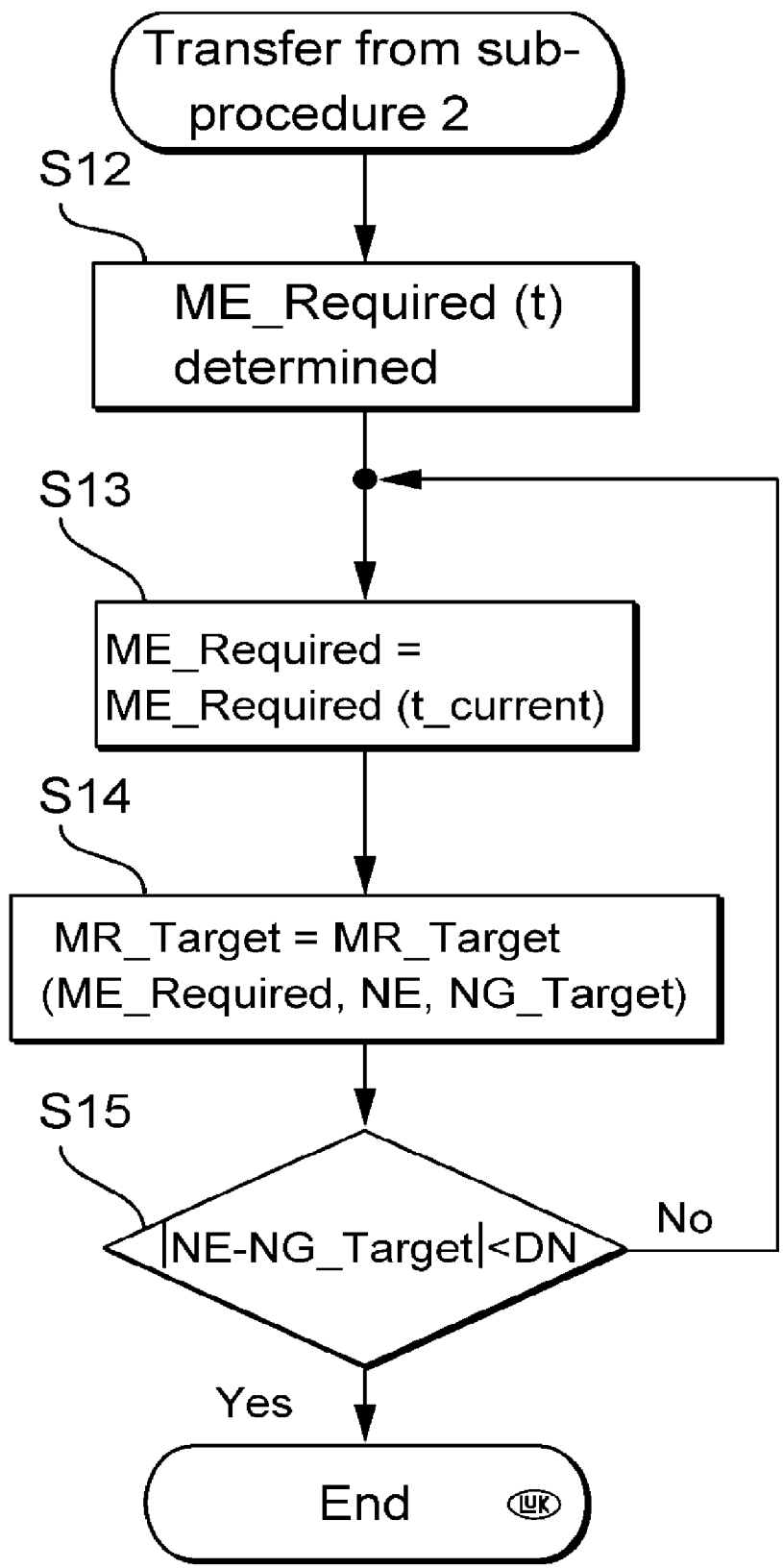

The entire development of such a switching process is illustrated below with reference to FIGS. 3A, 3B and 3C as an example of a switching process as the traction is turned up high; the following applies regarding the variables:

Gang_x: Gear number
MR_x: Friction moment in the clutch belonging to the indicated gear
Z_x: Gearshift state of the indicated gear (1=switched; 0=not switched)
ME_x: Engine moment (current required moment, current moment or target moment)
FS_x: Gear switch force for the indicated gear
DM: Moment threshold
DN: Number of revolutions threshold
NE: Number of engine revolutions
NG_x: Number of revolutions of the primary gear shaft belonging to the indicated gear
->Change of a controlled magnitude (time development)
=Allocation of variables, equality inquiry In a first step S1, one checks to see whether the new target gear step corresponds to a gear-raising requirement. If this is the case, then in step S2, the release of the clutch, associated with the new target gear, is requested, that is to say, the friction moment in the clutch belonging to that new target gear is returned to zero, and then in the next step S3, one checks to see whether the friction moment of this clutch has already been returned to zero. If this is the case, then in a next step S4, there is a requirement to set the switching state of the new target gear at 1, that is to say, to bring about the switched state. The current switching state is then checked out in a subsequent step S5 so that there can be a transfer of the flow control to the next step S6 with the condition of switching state=1 having been met.

During a second sub-procedure commencing with step S6, the moment takeover takes place by way of the associated clutch. For this purpose, one checks out first of all in step S6 whether there is to be a correction of the engine moment for the adaptation of the wheel moment prevailing on the drive wheel after the clutch switching process. Such an adaptation of the engine moment can take place when the engine target moment is not outside the moment range that can be attained by the engine, in other words, when the engine, for example, is not yet running under full load. In step S7, the engine moment and the clutch moment are raised in a coordinated fashion to the value of the engine target moment after the gear-switching process and when an engine moment adaptation is no longer possible or desired, then, in step S6, the clutch moment is raised to the value of the current actual engine moment.

Parallel in time, the predetermined pre-stress force for disengagement of the old gear step is applied in step S9 because the old gear step is still the current actual gear step. In the next step S10, the old gear step is disengaged and the gear variables are again engaged in the next step S11.

After step S11, the flow scheme is passed on to a third sub-procedure in which the drive motor is synchronized.

For this purpose, first of all, step S12 is used as a function of the current operating state of the engine to determine the required development for the above-described controlled engine engagement. This is followed by step S13 during which the required engine moment is determined as a function of the time and, in step S14, the clutch moment is determined in the clutch associated with the new target gear step as a function of the primary gear shaft revolution number belonging to the new target gear and the required engine moment. In step S15, one checks to see whether there is a difference between the engine revolution number and the primary gear shaft revolution number belonging to the new gear step and whether this revolution number differential is smaller than a revolution number threshold, that is to say, whether the synchronization process has been completed. If this is not the case, then one jumps back to step S13 and, after running through the procedure again, there is yet another test in step S15. If the test in step S15 shows that the number of revolutions differential has become smaller than a predetermined number of revolutions threshold, then motor synchronization has been completed.

In that way, one can implement a switching process that is hardly perceptible or longer perceptible to the driver using a changeover clutch between a friction clutch and the gear toothing of the individual gear steps, which is accompanied by a high level of gear-switching comfort.

Reference is made expressly to the claims regarding the features of the invention that are not explained in any greater detail above.

The patent claims, filed together with the application, are proposals for formulation without regard as to the achievement of further patent coverage. Applicant reserves the right to claim additional combinations of features that so far have been disclosed only in the specification and/or in the drawings.

References used in the subclaims point to the further design of the object of the main claim by the features of the particular subclaim; they are not be construed as a waiver of the attainment of an independent objective protection for the combination of features of the referenced subclaims.

The object of the subclaims can form separate and independent inventions with respect to the state of the art on the priority date; therefore, applicant reserves the right to turn them into the object of independent claims or declarations of subdivision. They can furthermore also contain independent inventions that display a design independent of the object of the preceding subclaims.

The exemplary embodiments are not to be construed as a restriction of the invention. Instead, numerous amendments and modifications are possible in the context of the above disclosure, in particular, such variants, elements and combinations and/or materials that can be gathered by the expert with a view to the solution of the problem, for example, by combination or modification of individual features or elements or process steps described in the general specifications and embodiments as well as the claims and contained in the drawings and that by means of combinable features lead to a new object or to new process steps or process step sequences also to the extent that they involve production, testing and working methods.

What is claimed is:

1. A method for controlling the switching processes of a powershift gearbox and at least one gear actuator, where said gearbox is coupled to an engine and comprises a new friction clutch and a plurality of gear steps displaying a plurality of gear step clutches and said at least one gear actuator is arranged to actuate the plurality of gear steps, the method comprising the following steps:
    taking over a moment of the engine by means of the new friction clutch, where the new friction clutch is associated with a new gear step from the plurality of gear steps;
    applying, by means of the gear actuator, a predetermined pre-stress force to a gear step clutch associated with an old gear step from the plurality of gear steps, where the old gear step is engaged and the predetermined pre-stress force is applied in a time interval up to and including the taking over of the moment of the engine by means of the new friction clutch;
    disengaging the old gear step when the moment of the engine and a moment of the new friction clutch are in balance; and,
    reducing slippage in the new friction clutch after disengaging the old gear step, wherein reducing slippage further comprises changing, at a start of the slippage reduction, a second required engine moment according to a stepped function and adapting the second required engine moment to a desired moment for a driver in an extensively linear fashion after the switching process.

2. The method according to claim 1 wherein reducing slippage in the new friction clutch further comprises combining action upon the engine moment and the new friction clutch moment.

3. The method according to claim 1 further comprising:
    preselecting a first required engine moment according to the following relationship:

$$\frac{1}{J_{Motor}} \int_{T_{Start}}^{T_{End}} (M_{Motor} - M_{Clutch}) \cdot dt = \Delta\omega.$$

4. The method according to claim 1 wherein the new friction clutch operates in a slippage state and a stiction state; and,
    the method further comprising:
        the engine moment implementing an extensive approach to the new friction clutch moment; and,
        triggering the new friction clutch so that there is a gentle transition from the slippage state into the stiction state of the new friction clutch.

5. The method according to claim 1 further comprising:
    changing the engine moment so that a drive moment is substantially equal before and after the switching process, where the drive moment acts upon a wheel.

6. The method according to claim 5 further comprising:
    changing the engine moment during the take over of the engine moment.

7. A method for controlling the switching processes of a powershift gearbox and at least one gear actuator, where said gearbox is coupled to an engine and comprises a new friction clutch and a plurality of gear steps displaying a plurality of gear step clutches and said at least one gear actuator is arranged to actuate the plurality of gear steps, the method comprising the following steps:
    taking over a moment of the engine by means of the new friction clutch, where the new friction clutch is associated with a new gear step from the plurality of gear steps;
    applying, by means of the gear actuator, a predetermined pre-stress force to a gear step clutch associated with an old gear step from the plurality of gear steps, where the old gear step is engaged and the predetermined pre-stress force is applied in a time interval up to and including the taking over of the moment of the engine by means of the new friction clutch; and,
    disengaging the old gear step when the moment of the engine and a moment of the new friction clutch are in balance, wherein the old gear step comprises a high-transmission first gear step with a primary gear shaft, where an old friction clutch operates in a slippage state, the engine rotates at a first rate, and the primary gear shaft rotates at a second rate; and, the method further comprising:
    performing a startup process with the high-transmission first gear step; and,
    the new friction clutch taking over the engine moment before the slippage state of the old friction clutch terminates or before the first rate reaches the second rate.

8. A powershift gearbox, comprising:
    an old gear step, where the old gear step is engaged;
    a new gear step to be connected to the engine, where the old and new gear steps display a plurality of gear step clutches;
    a new friction clutch associated with the new gear step; and,
    at least one gear actuator operatively arranged to actuate the old and new gear steps, wherein the gear actuator is arranged to apply a predetermined pre-stress force to a gear step clutch for the old gear step, before or during the take over of a moment of the engine by a moment of the new friction clutch, wherein the old gear step is arranged to disconnect when the engine moment and the new friction clutch moment are substantially balanced, wherein the old gear step comprises a high-transmission first gear step with a primary gear shaft, the high-transmission first gear step arranged for starting up, the primary gear shaft arranged to rotate at a first rate, and an old friction clutch operates in a slippage state, and wherein the engine is revolving at a second rate and the new friction clutch is arranged to take over the engine moment from the old friction clutch before the slippage state of the old friction clutch terminates or before the first rate reaches the second rate.

* * * * *